United States Patent
Nakahara

(10) Patent No.: US 11,537,333 B2
(45) Date of Patent: Dec. 27, 2022

(54) CLIENT DEVICE, CONTROL METHOD THEREOF AND STORAGE MEDIUM FOR MANAGING CLIENT DEVICE

(71) Applicant: CANON KABUSHIKI KAISHA, Tokyo (JP)

(72) Inventor: Hidetaka Nakahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 16/934,417

(22) Filed: Jul. 21, 2020

(65) Prior Publication Data
US 2021/0026575 A1 Jan. 28, 2021

(30) Foreign Application Priority Data

Jul. 22, 2019 (JP) .............................. JP2019-134700

(51) Int. Cl.
*G06F 11/34* (2006.01)
*G06F 3/12* (2006.01)
*G06F 11/30* (2006.01)
*H04L 67/01* (2022.01)

(52) U.S. Cl.
CPC .......... *G06F 3/1207* (2013.01); *G06F 3/1259* (2013.01); *G06F 3/1263* (2013.01); *G06F 3/1267* (2013.01); *G06F 3/1273* (2013.01); *G06F 11/3055* (2013.01); *G06F 11/34* (2013.01); *H04L 67/01* (2022.05); *G06F 3/1289* (2013.01)

(58) Field of Classification Search
CPC .... G06F 3/1207; G06F 3/1259; G06F 3/1273; G06F 3/1289; G06F 11/34; G06F 11/3055
USPC .................. 358/1.15, 1.16; 399/9, 10, 79
See application file for complete search history.

(56) References Cited

U.S. PATENT DOCUMENTS

| | | | |
|---|---|---|---|
| 8,891,121 B2 | 11/2014 | Nakahara | |
| 9,274,981 B2 | 3/2016 | Nakahara | |
| 2013/0057918 A1* | 3/2013 | Ohta | G06F 3/1291 358/1.15 |
| 2013/0094054 A1* | 4/2013 | Baba | G03G 15/5079 358/1.15 |

FOREIGN PATENT DOCUMENTS

JP 2013101596 A 5/2013

* cited by examiner

*Primary Examiner* — Jamares Q Washington
(74) *Attorney, Agent, or Firm* — Carter, DeLuca & Farrell LLP

(57) ABSTRACT

Provided is a client device configured to communicate with a server via a network, the client device comprising: one or more memories; and one or more processors that execute a set of instructions to: acquire counter information which is totaled according to performing a job by the client device and is stored in the one or more memories; determine whether the client device has been performed at least one job during acquiring the counter information; reacquire counter information in a case where it is determined that the client device has been performed at least one job during acquiring the counter information; and transmit the reacquired counter information to the server.

7 Claims, 8 Drawing Sheets

FIG. 6
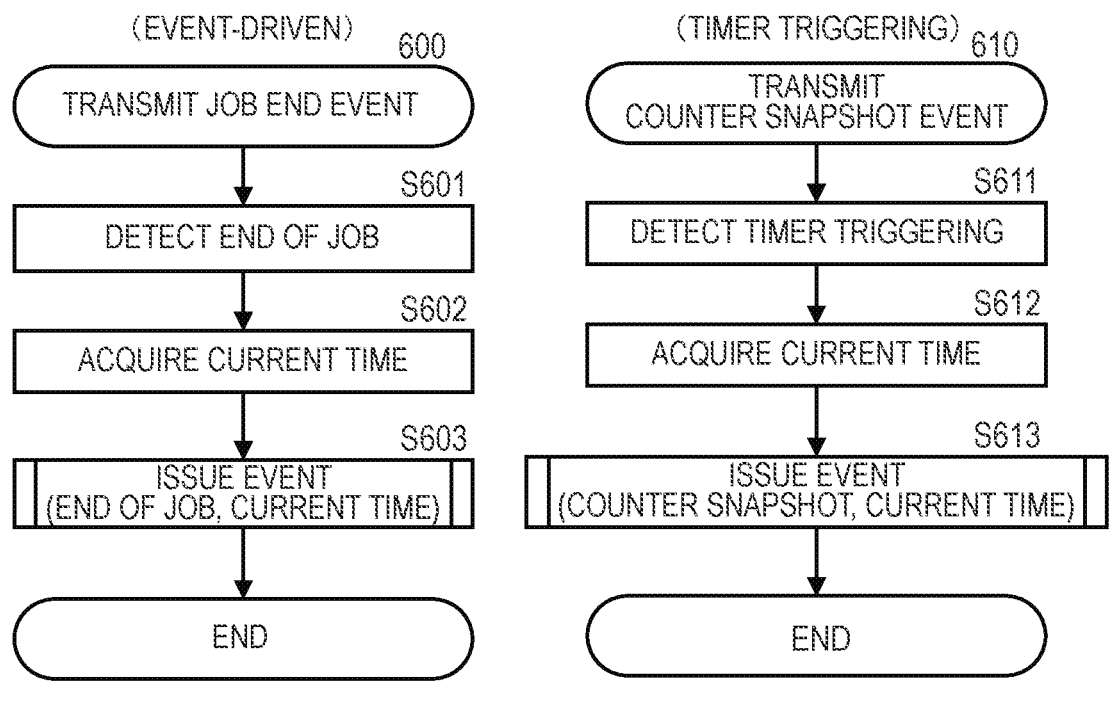
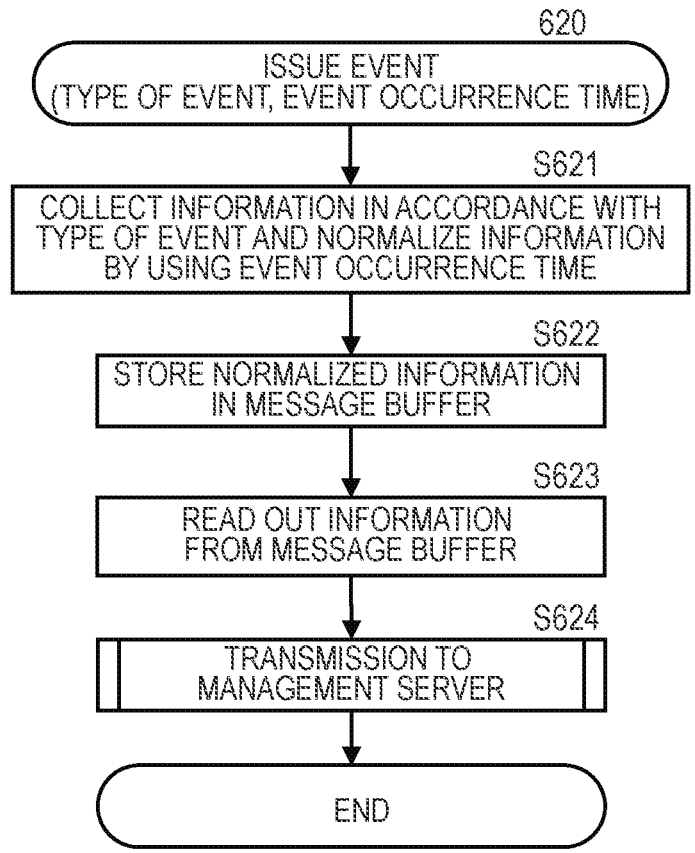

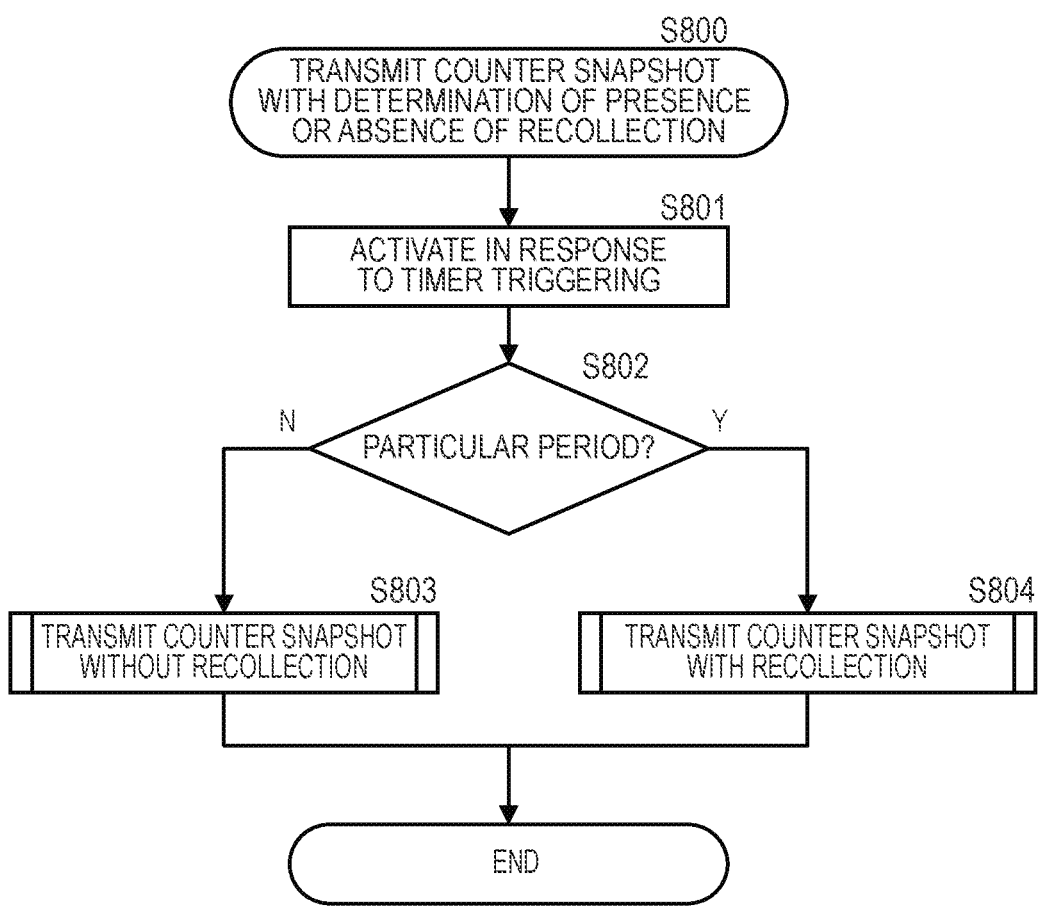

CLIENT DEVICE, CONTROL METHOD THEREOF AND STORAGE MEDIUM FOR MANAGING CLIENT DEVICE

BACKGROUND OF THE INVENTION

Field of the Invention

The present disclosure relates to a client device, a control method thereof and storage medium.

Description of the Related Art

There is a device management system that transmits various event logs to an event log management server via the Internet from a working device and manages and analyzes the event logs on the server side in order to monitor the state of an information processing device. Further, such a logging system may be used for maintenance or billing management by storing counter information involved in the number of times of performing various functions or operations of the information processing device and periodically transmitting the counter information to the server.

When billing is performed in accordance with the usage status of a user, accurate counter information is required to be acquired. However, since the information processing device is always working, the counter information changes from hour to hour, and the counter information to be collected may cover a wide variety of information for each user, for each department, for each function, for the overall device, or the like. There is a problem that, during acquisition of multiple pieces of counter information, when an event that increments the related count occurs, consistency between the acquired multiple pieces of counter information is not maintained and thus the correct counter information is unable to be acquired.

An image forming device disclosed in Japanese Patent Application Laid-Open No. 2013-101596 solves the above problem by stacking counter acquiring jobs in a job que of an information processing device to exclude another job and causing another job not to operate during acquisition of counter information when acquiring the counter information.

However, processes of acquisition of counter information and a transmission to a server are performed at the backend, and the status thereof is invisible for the user. Nevertheless, exclusion of a job executed by a user operation significantly reduces convenience when the user uses the information processing device.

SUMMARY OF THE INVENTION

The present disclosure is client device configured to communicate with a server via a network, the client device comprising: one or more memories; and one or more processors that execute a set of instructions to: acquire counter information which is totaled according to performing a job by the client device and is stored in the one or more memories; determine whether the client device has been performed at least one job during acquiring the counter information; reacquire counter information in a case where it is determined that the client device has been performed at least one job during acquiring the counter information; and transmit the reacquired counter information to the server.

Further features of the present invention will become apparent from the following description of exemplary embodiments with reference to the attached drawings.

BRIEF DESCRIPTION OF THE DRAWINGS

FIG. 6 is a flowchart from event detection to transmission to a management server of an embodiment.

FIG. 8 is a flowchart including switching of whether or not to perform snapshot information correction of another embodiment.

DESCRIPTION OF THE EMBODIMENTS

Embodiments for implementing the present disclosure will be described below with reference to the drawings.

First Embodiment

Figure 1:
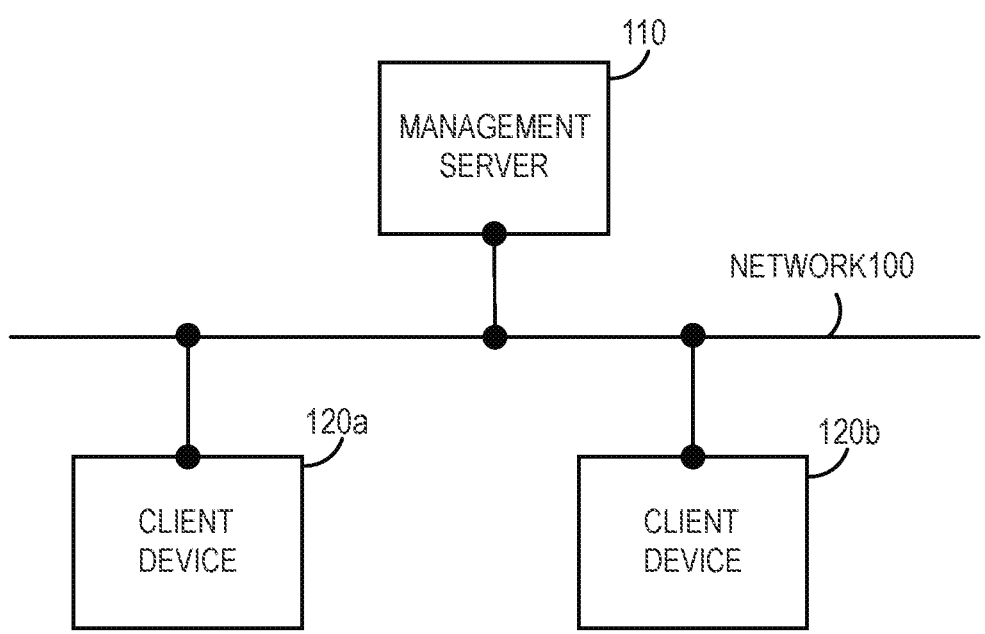
FIG. 1 is a diagram of a device management system configuration illustrating the overall system formed of an information processing device and a server.

FIG. 1 is a diagram of a device management system configuration illustrating the overall system in the present disclosure. A management server 110 of an information processing device described in the present embodiment and client devices 120 of the information processing device are connected to a network 100.

The client device 120 has a communication function that informs the management server 110 of an event caused in the device in a history event format. The management server 110 further has a function of storing an event informed from the plurality of client devices 120 in a storage in the management server 110. The information accumulated in the storage is used for information analysis of monitoring in work or the like.

In the present embodiment, the management server 110 is realized by a general information processing device such as a computer that can have data storage, information processing calculation, and network communication functionality or a cloud service having the same function.

The client device 120, which is an information processing device, will be described for a multifunctional device that realizes multiple types of functions, for example, a copying function, a facsimile function, or the like as an example. In addition to a history of execution of these functions, the client device 120 has a function of informing the management server 110 of a history of transition or recovery to a power saving state, a history of transition, recovery, or the like to an abnormal state such as occurrence of an error, or the like.

Figure 2:
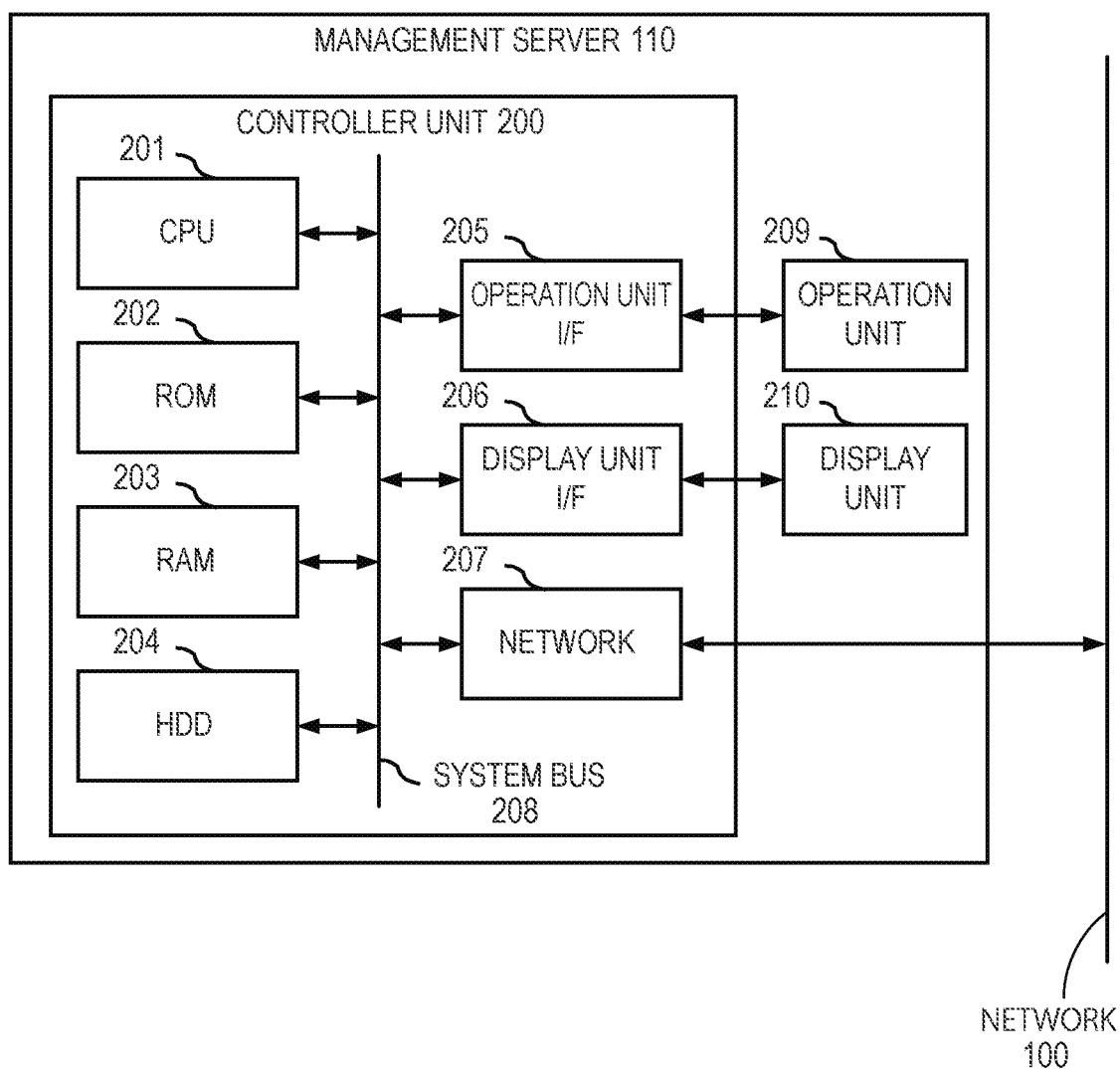
FIG. 2 is a block diagram illustrating a hardware configuration of a management server.

FIG. 2 is a block diagram illustrating a hardware configuration when the management server 110 in the present disclosure is realized by an information processing device such as a general computer. The management server 110 includes a controller unit 200, an operation unit 209, and a display unit 210. The controller unit 200 has a central processing unit (CPU) 201. The CPU 201 activates operating system (OS) by using a boot program stored in a read only memory (ROM) 202.

On the OS, the CPU 201 executes an application program stored in a hard disk drive (HDD) 204 and thereby performs various processes. As a working area of the CPU 201, a random access memory (RAM) 203 is used.

The HDD 204 stores the application program described above and data of settings, a history, or the like. The CPU 201 is connected to an operation unit I/F 205, a display unit I/F 206, and a Network 207 together with the ROM 202, the RAM 203, and the HDD 204 via a system bus 208.

The operation unit I/F 205 is an interface with the operation unit 209 formed of a mouse, a keyboard, or the like and transmits information input by a user using the operation unit 209 to the CPU 201.

The display unit I/F 206 outputs, to the display unit 210, image data to be displayed on the display unit 210 formed of a display or the like.

The Network 207 is further connected to the network 100 and inputs and outputs information via the network 100 between respective devices on the network 100.

Figure 3:
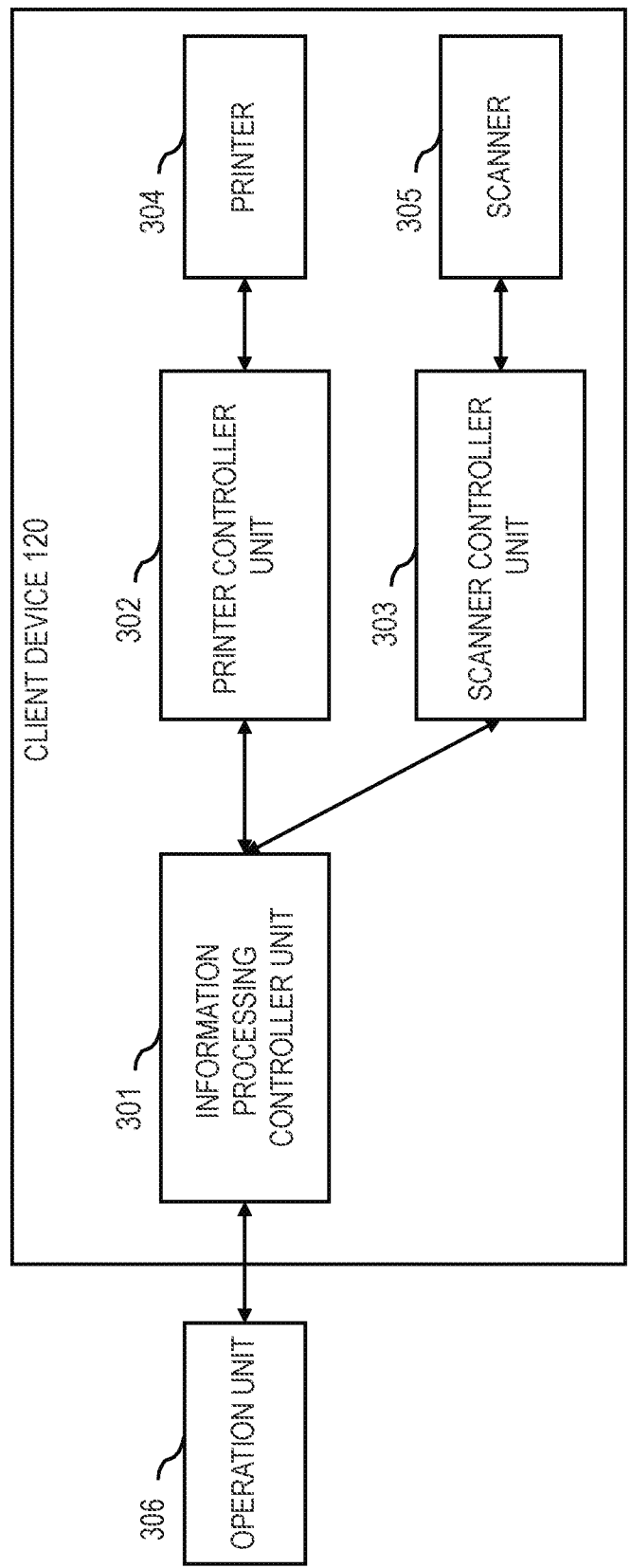
FIG. 3 is a block diagram illustrating a hardware configuration of a client device.

FIG. 3 is a block diagram illustrating a hardware configuration of the client device 120 in the present disclosure. The client device 120 is a multifunctional device including an information processing controller unit 301, a printer controller unit 302, a scanner controller unit 303, a printer 304, a scanner 305, and an operation unit 306.

The information processing controller unit 301 is a controller that unifies information processing control related to an operation of the client device 120 and is connected to the operation unit 306. The information processing controller unit 301 is further connected to the printer controller unit 302 that controls the printer 304, which is an image output device, or the scanner controller unit 303 that controls the scanner 305, which is an image input device.

Figure 4:
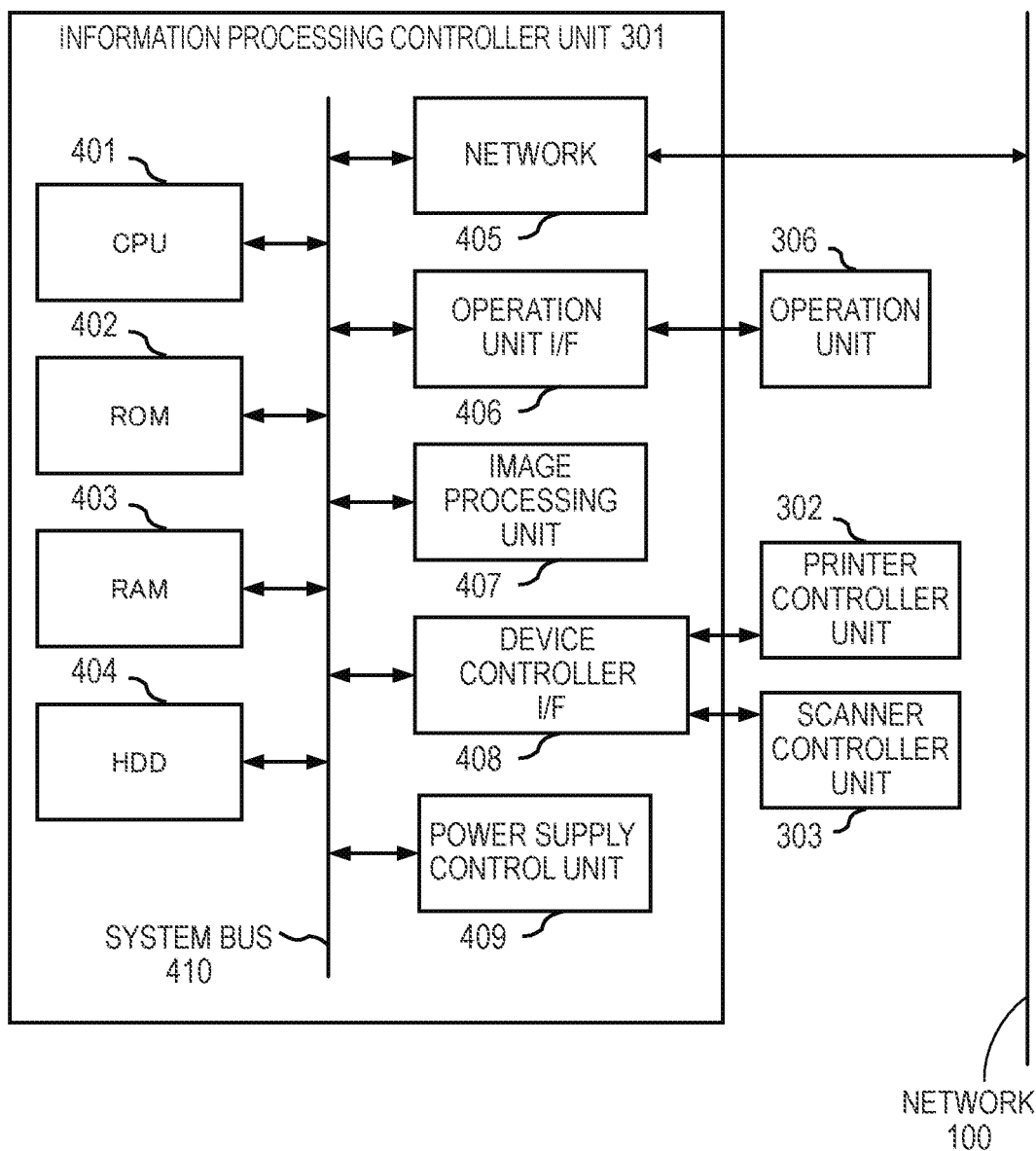
FIG. 4 is a block diagram illustrating a configuration of an information processing controller unit of the client device.

FIG. 4 is a block diagram illustrating a hardware configuration of the information processing controller unit 301 of the client device 120 in the present disclosure. The information processing controller unit 301 has a CPU 401, and the CPU 401 activates OS by using a boot program stored in a ROM 402.

On the OS, the CPU 401 executes an application program stored in an HDD 404 and thereby performs various processes. As a working area of the CPU 401, a RAM 403 is used.

The RAM 403 further provides a working area and an image memory area for temporarily storing image data.

The HDD 404 stores the application program described above, image data, various setting values, or a history.

The CPU 401 is connected to an operation unit I/F 406, a device controller I/F 408, a Network 405, an image processing unit 407, and a power supply control unit 409 together with the ROM 402, the RAM 403, and the HDD 404 via a system bus 410.

The operation unit I/F 406 is an interface with the operation unit 306 having a touch panel and outputs, to the operation unit 306, image data to be displayed on the operation unit 306. The operation unit I/F 406 further transmits information input by a user using the operation unit 306 to the CPU 401.

The device controller I/F 408 is connected to the scanner controller unit 303 and the printer controller unit 302 and performs synchronous/asynchronous conversion of image data.

The Network 405 is connected to the network 100 and inputs and outputs information via the network 100 between respective devices on the network 100.

The image processing unit 407 performs an output image process to the printer 304, an input image process from the scanner 305, or a process such as image rotation, image compression, resolution conversion, color space conversion, or gradation conversion.

The power supply control unit 409 performs power supply control of the overall device. The power supply control unit 409 controls transition to a power saving state other than a normal powering state, a recovery to a normal state, or the like in addition to power on/off control.

Figure 5:
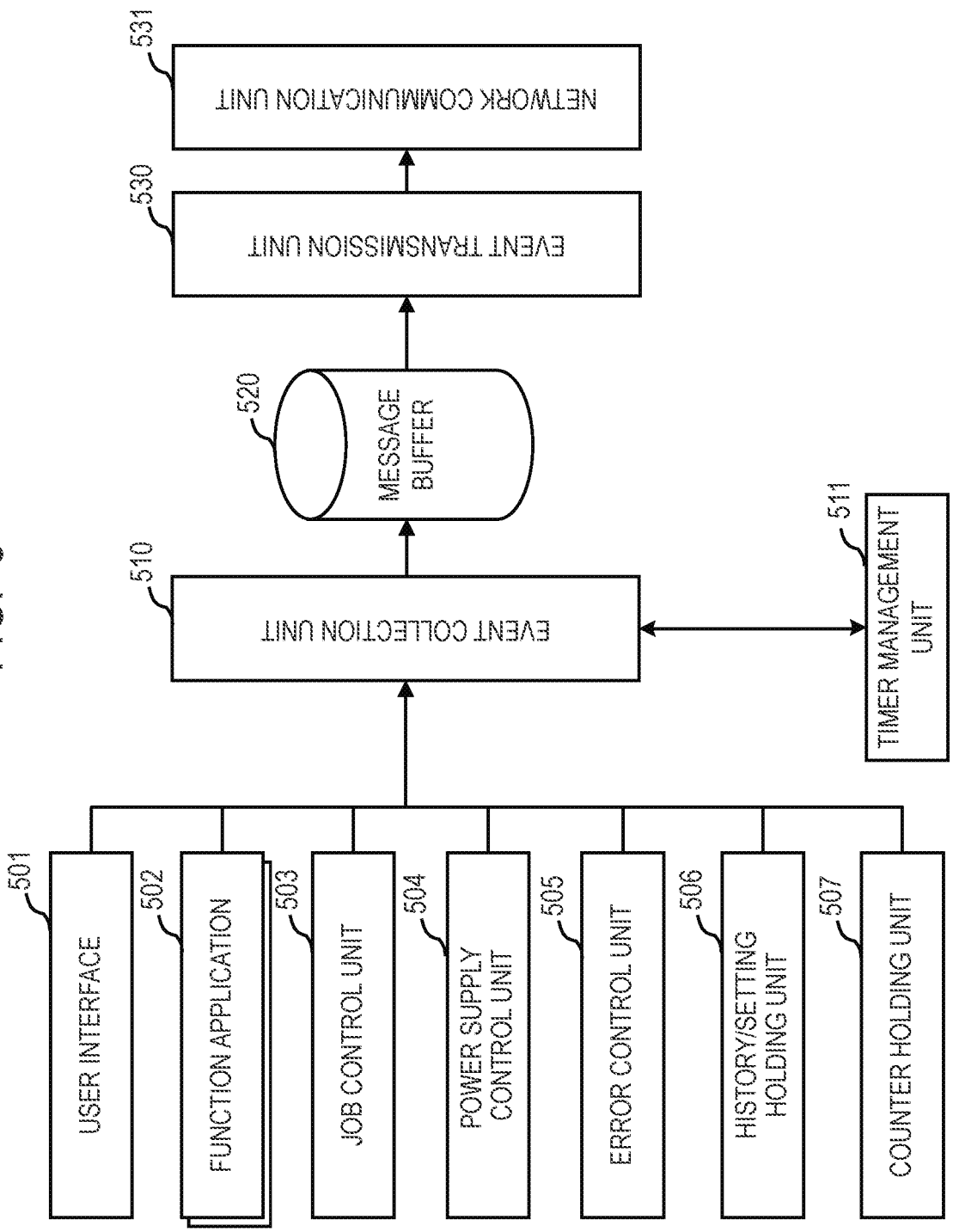
FIG. 5 is a software block diagram of the client device.

FIG. 5 is a software block diagram of the client device 120 in the present disclosure. In the present embodiment, a program stored in any storage component of the RAM 403, the HDD 404, or the ROM 402 is implemented when executed by the CPU 401. The client device 120 is a multifunctional device, for example, and software that realizes scanning, printing, and various functions using a network or a memory storage operates thereon.

A user interface 501 has functions of displaying a window operated by the user on the operation unit 306 or transferring the motion to the software when the user operates the user interface 501.

A function application 502 includes a plurality of applications for copying, printing, mail transmission, or the like in a device and causes an application function of the client device 120 to operate in response to a user instruction via the operation unit 306, data reception via the Network 405, or the like as a trigger.

A job control unit 503 controls the printer controller unit 302 or the scanner controller unit 303 to perform scanning or printing in accordance with an instruction from the function application 502.

A power supply control unit 504 controls the power supply management unit 409 and manages transition between a normal powering state and a power saving state in synchronization with the state of software in the device.

An error control unit 505 receives a notification of an abnormal state mainly occurring in the job control unit 503, the printer controller unit 302, the scanner controller unit 303, or the like and controls of stopping the overall system or providing an instruction of a degradation operation.

A history/setting holding unit 506 manages nonvolatile information in the device. The history/setting holding unit 506 holds settings required for control of the client device 120 or a job and summarizes and stores an operation history of the user, or a job execution result and error occurrence, or the like. Further, log information left for a use in analysis and debugging when a system malfunction occurs is stored therein. The entity of the nonvolatile data is held in the HDD 404.

A counter holding unit 507 summarizes and stores various event occurrence information occurring in the device in a form of a counter. The counter holding unit 507 counts the number of sets for a scan, the number of sets for a printing, the number of times the copying function or the like is used, or the like. The counter holding unit 507 further groups and holds the counter for each user, for each department to which a user belongs, for the overall device, or the like. The entity of nonvolatile data is held in the HDD 404.

Since an event collection unit 510 monitors a state change occurring in respective modules (501 to 507) in the device and transmits the state change to the management server 110, the event collection unit 510 has functions of performing normalization in a form of an event and storage in a message buffer 520. The message buffer 520 is on the HDD 404, and the normalized event is stored in a nonvolatile area. A general-purpose format such as JSON is used herein for the normalization. In accordance with a type of an event, in addition to basic information such as an event name, occurrence time, a serial number of an information processing device, various types of information are additionally provided. The event collection unit 510 acquires the additional information by referencing nonvolatile information such as the history/setting holding unit 506 or the counter holding unit 507 or dynamically acquires the additional information from a state of respective modules (501 to 507) in the device, or the like.

The event collection unit 510 further performs an information acquisition operation periodically activated by using a timer management unit 511 in addition to a state change. For example, a timer for every hour, every day, or the like is triggered by using the timer management unit 511. The event collection unit 510 acquires settings of the timing or a snapshot of a history from the history/setting holding unit 506, acquires counter information from the counter holding unit 507, and stores a snapshot event in the message buffer 520.

An event transmission unit 530 reads out information from the message buffer 520 and transmits an event to the management server 110 via the network communication unit 531 in response to event issuance by detecting writing to the message buffer 520 or the like. A network communication unit 531 communicates by using the Network 405.

FIG. 6 is a flowchart illustrating a flow of event transmission to the management server 110 when various events occur in the device of the client device 120 in the present disclosure. In the present embodiment, a program stored in any storage component of the RAM 403, the HDD 404, or the ROM 402 is implemented when executed by the CPU 401.

[Job End Event: Event-Driven]

As an event related to a state change of the device, a job end event such as copying is illustrated in a flowchart 600 as an example.

First, in step S601, the event collection unit 510 detects the end of a job.

In subsequent step S602, the current time (occurrence time) is acquired.

Then, in step S603, the event collection unit 510 performs, on a subroutine of event issuance, a process by using an event name (job end event) and the acquired current time (occurrence time) as arguments to transmit the event to the management server 110.

[Counter Snapshot Event: Timer Triggering]

Transmission of a snapshot event activated periodically by using a timer is illustrated with a counter snapshot as an example in a flowchart 610.

First, in step S611, the event collection unit 510 accepts timer triggering from the timer management unit 511.

In subsequent step S612, the current time (occurrence time) is acquired.

In step S613, the event collection unit 510 performs, on a subroutine of event issuance, a process by using an event name (counter snapshot event) and the acquired current time (occurrence time) as arguments to transmit the event to the management server 110.

[Subroutine of Event Issuance]

The subroutine of event issuance in steps S603 and S613 will be described in detail in the next flowchart 620.

First, in step S621, the event collection unit 510 collects pre-linked information from respective modules in the device in accordance with the received event content. For example, in a case of the job end event called from step S603, a user name who executes a job, classification of color or monochrome, the number for sets of a scan, the number of sets for printing, and a snapshot of a counter of a target user or the like will correspond to information to be collected. In a case of the snapshot event of the counter called from step S613, targeted counter information is collected. In a case of a snapshot event, the amount of information may increase when counter information or the like for all the users is collected, and the collection process may require several tens of seconds to several minutes. The provided event occurrence time information is added to the collected information, and the collected information is normalized in a general-purpose format such as JSON.

In step S622, the event collection unit 510 stores the normalized event information in the message buffer 520. The content transmitted to a server is fixed at this time.

In step S623, the event transmission unit 530 that has asynchronously detected this writing reads out event information from the message buffer 520.

In step S624, the event transmission unit 530 performs an operation of transmission to the management server 110. Here, the process up to completion of transmission including an authentication operation for a server, a retry process at the time of communication error, or the like is performed. The management server 110 stores the received event information in the HDD 204.

As described above, various events occurring in the client device 120 are transmitted to and collected in the management server 110.

Since information required for analysis or management is logically available on the server side only by transmitting an event-driven change event to the server, periodical transmission of snapshot data is not essentially required. However, the event-driven data transmission has a risk that data may be lost before the data reaches a server due to the state of a device, the state of a network, or the like. By taking this into consideration, it is necessary to complement the data by transmitting data of a snapshot event periodically activated by timer triggering in addition to event-driven data transmission.

At this time, for example, the flowchart 600 is activated for each job occurrence unit by a user operation. On the other hand, since the flowchart 610 is periodically activated in cooperation with a triggering operation of a pre-set timer, the flowchart 610 may be activated at the same timing. Due to the simultaneous occurrence of data update and acquisition processes, inconsistency may occur in the collected data. The operation will be described with reference to tables.

Table 1 (table: counter snapshot for each user) represents samples of a counter snapshot collected from the counter holding unit 507. Information on the number of accumulative operations of monochrome printing, color printing, monochrome scanning, or color scanning is stored for each user. Since the counter holding unit 507 manages data by using different files or the like for each user, collection may require long time. In this example, data collection for 999 users is performed, and time stamps representing time when each user data is acquired are to be stored. It is assumed here that it takes about two minutes. The event collection unit 510 normalizes a state acquired in such a way in JSON or the like and stores the normalized state in the message buffer 520.

TABLE 1

Counter Snapshot for Each User

| User ID | Accumulated Counter Value | | | | Data Acquisition Time |
| --- | --- | --- | --- | --- | --- |
| | PRINT-BW | PRINT-CL | SCAN-BW | SCAN-CL | |
| 001 | 10 | 10 | 0 | 0 | 2018 Nov. 15 10:00:00:000 |
| 002 | 0 | 40 | 0 | 20 | 2018 Nov. 15 10:00:00:300 |
| ... | ... | ... | ... | ... | ... |
| 999 | 1 | 0 | 0 | 0 | 2018 Nov. 15 10:02:00:000 |
| Sum in Device | 201 | 1002 | 100 | 302 | 2018 Nov. 15 10:02:00:300 |

On the other hand, when a user 002 and a user 999 execute two copy jobs and one printing job during the two minutes, respectively, two events as illustrated in Table 2 (table: job end event with an accumulated count) occur as a job end event, for example. The event collection unit 510 collects information such as types of jobs, a user ID, job start time, job end time, or the like, normalizes the collected information in JSON or the like, and stores two events in the message buffer 520 every time a job end event occurs.

TABLE 2

Job End Event with Accumulated Count

| Job Kind | User ID | Job Start Time | Job Complete Time | State | Accumulated Count Value | | | |
| --- | --- | --- | --- | --- | --- | --- | --- | --- |
| | | | | | PRINT-BW | PRINT-CL | SCAN-BW | SCAN-CL |
| COPY | 002 | 2018 Nov. 15 10:01:00:000 | 2018 Nov. 15 10:01:10:000 | Success | 0 | 42 | 0 | 22 |
| PRINT | 999 | 2018 Nov. 15 10:01:30:000 | 2018 Nov. 15 10:01:50:000 | Success | 1 | 0 | 0 | 0 |

The end time of a copy job of the user 002 in Table 2 is the time after the data acquisition time of the user 002 during collection of a snapshot of a counter in Table 1 and occurs before the data acquisition time of the sum in the device. Thus, the count of the user 002 does not increase at data acquisition time of the snapshot. However, there is an inconsistent state where the job of the user 002 in Table 2 is reflected as a sum at data acquisition time of the sum in the device. Further, since the printing job of the user 999 is performed during counter snapshot collection and the job end of the user 999 is completed before snapshot collection timing of the user 999, it is understood that there is no inconsistency.

As illustrated in this example, two types of event transmission including the operation of providing the acquisition time and transmitting snapshot data and the operation of providing information on a state change in an event-driven manner and transmitting the snapshot data are performed. On the server side, it is possible to analyze information on a snapshot in Table 1 and data transmitted for each event occurrence in Table 2 and find and correct data in which inconsistency occurs in a snapshot.

Note that, instead of Table 2 (table: job end event with an accumulated count), transmission of an event as illustrated in Table 3 (table: job end event with a count for each job) may be considered as an embodied example. This is structured to provide a difference count representing how much the corresponding job has added a count instead of an accumulated count for each user.

TABLE 3

Job End Event with Job Unit Count

| Job Kind | User ID | Job Start Time | Job Complete Time | State | Count Value for Each Job | | | |
| --- | --- | --- | --- | --- | --- | --- | --- | --- |
| | | | | | PRINT-BW | PRINT-CL | SCAN-BW | SCAN-CL |
| COPY | 002 | 2018 Nov. 15 10:01:00:000 | 2018 Nov. 15 10:01:10:000 | Success | 0 | 2 | 0 | 2 |
| PRINT | 999 | 2018 Nov. 15 10:01:30:000 | 2018 Nov. 15 10:01:50:000 | Success | 1 | 0 | 0 | 0 |

While the structure of Table 3 has a larger amount of information and has broader contents that can be analyzed than the structure of Table 2 for analyzing detail information for each job, a use of Table 3 is inefficient for executing the data correction described above, because all the count values of job end events are required to be summed without omission. It is also possible to provide both of an accumulated value and a difference value for each job to an event.

With a use of information on both the events described above, inconsistent data can be corrected on the server side. Specifically, during a counter snapshot event being executed, when a job end event occurs, information required for acquiring information on the counter snapshot event is collected from the job end event and transmitted to a server. The server generates, stores, and manages consistent data from all the event information.

However, to efficiently perform analysis on the server side, it is desirable to transmit data to a server after the data is corrected instead of transmitting the data with inconsistency.

A method of correcting the inconsistent state and transmitting the snapshot data to the management server in such a way will be described below with reference to FIG. 7.

[Correction Flow of Snapshot Data]

Figure 7:
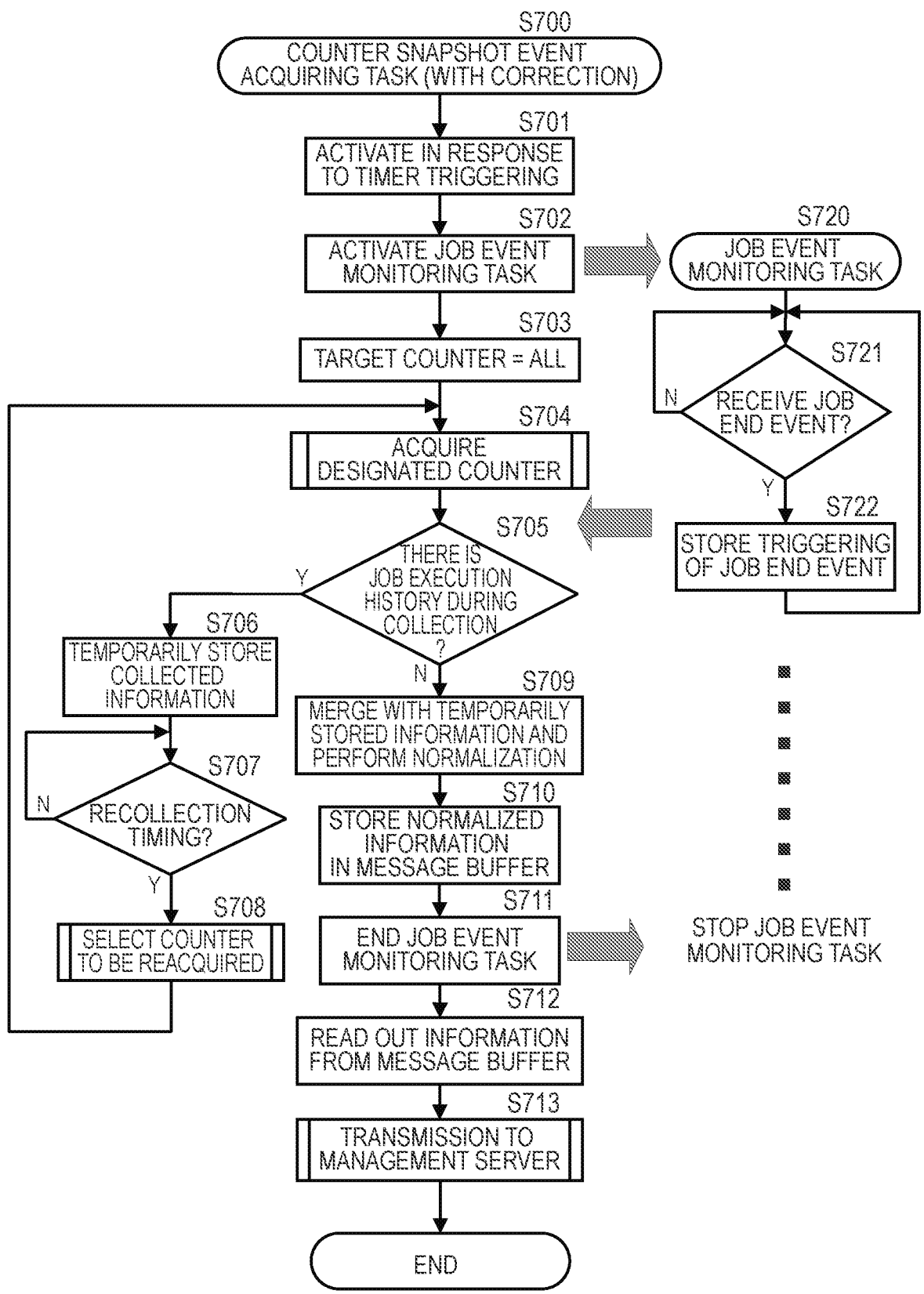
FIG. 7 is a flowchart of event transmission including information correction of an embodiment.

FIG. 7 is a flowchart including data recollection for snapshot data correction when a job is executed in transmitting a counter snapshot of the present disclosure. The process is implemented when a program stored in any storage component of the RAM 403, the HDD 404, or the ROM 402 is executed by the CPU 401.

A flow of a counter snapshot acquisition task 700 is a series of processes from data acquisition to transmission to the management server, and a flow of a job event monitoring task 720 controls the operation of the counter snapshot acquisition task 700. Both of them operate as a function of the event collection unit 510.

In step S701, in response to receiving a notification from the timer management unit 511, the event collection unit 510 activates a counter snapshot event acquisition task.

In subsequent step S702, the CPU 401 activates the job event monitoring task 720.

[Job Event Monitoring Task]

On the other hand, in the job event monitoring task 720, the process starts monitoring whether or not a job end event occurs in step S721 after activation.

Specifically, in step S721, the process waits until the job end event is received, and when a job end event is received, the process proceeds to step S722.

In step S722, triggering of the job end event is recorded as a job execution history, and the process returns to step S721.

The job event monitoring task 720 repeats the above operations.

Illustration returns to description of the flow of the counter snapshot acquisition task.

In step S703, the event collection unit 510 decides a counter to be collected. For example, all of the counters of all the registered users and the counter of the overall device as previously illustrated in Table 1 are designated. The event collection unit 510 then proceeds to step S704 and performs an operation of collecting values of the designated counters. As described above, the process may require several tens of seconds to several minutes in accordance with the number of users. After the event collection unit 510 ends the collection operation of the counter in step S704, the event collection unit 510 determines whether or not the job event monitoring task 720 detects an execution history of a job in step S705.

The process proceeds to step S706 if the execution history of a job is detected, and the process proceeds to step S709 if the execution history of a job is not detected.

[Case Where Execution History of Job is Detected]

In step S706, the event collection unit 510 temporarily stores the collected counter information.

Then, the process proceeds to step S707 and waits for recollection to be performed until a predetermined timing.

As the predetermined timing when recollection is performed, timings described below are specifically considered.

A timing after a predetermined time has elapsed.

A timing when transfer of the device to a power saving state (sleep) is detected.

A timing when a job que in the device becomes empty.

A timing when a user who logs in becomes absent in the device.

In any cases, one or more timings when execution of a job is unlikely to occur are defined in advance.

In step S707, when the event collection unit 510 of the counter snapshot acquisition task 700 in a waiting state for a recollection instruction detects arrival of the timing for recollecting as described above, the process proceeds to step S708.

In step S708, a content of the counter to be reacquired is selected. As a decision of a content to be reselected, cases described below are considered.

Reacquire data after job end event detection.

Reacquire only data for the corresponding user by checking the person who executes the executed job.

The check execution content of a job and reacquire of only data of either a printing system or a scan system in which the count has increased.

As described above, in accordance with the content of an ended job, an operation of narrowing down contents to be reacquired is performed. In this operation, only any one of the contents described above is defined in advance, and a recollection is performed in the logic.

When a content of the counter to be reacquired can be selected, the event collection unit 510 returns to step S704 and reacquires the selected counter information. Then, the process again proceeds to step S705 and check whether or not a job is executed during a recollection process, and if occurrence of a new job is not recorded, the process proceeds to step S709.

In step S709, the event collection unit 510 merges counter information temporarily stored in advance and the recollected counter information and creates normalized information.

In subsequent step S710, the event collection unit 510 stores the merged and normalized information in the message buffer 520.

In step S711, since data is fixed at this time, the job event monitoring task is stopped.

In step S712, the event transmission unit 530 that asynchronously detects writing in step S710 reads out event information from the message buffer 520.

In subsequent step S713, the event transmission unit 530 performs a transmission operation to the management server 110. Here, the process up to completion of transmission including an authentication operation for a server, a retry process at the time of communication error, or the like is performed. The management server 110 to which the event is transmitted stores the received event information in a storage.

In accordance with the above operations, even in case of contention of both operations, it is possible to efficiently create consistent data with recollection of the minimum necessary data and transmit the created data to the management server 110 without excluding execution of a job and a counter snapshot.

Second Embodiment

In the first embodiment, when a job is executed during a counter snapshot event being executed, the corresponding counter value is recollected from a job complete event of the executed job, and data having no inconsistency is transmitted to the management server. In the second embodiment, usage needs and a process load of a multifunctional device are taken into consideration, and a recollection operation that is more efficient than that of the first embodiment is realized.

The second embodiment of the present disclosure will be described below with reference to FIG. 8.

FIG. 8 is a flowchart implementing counter snapshot transmission. In the specification, the program is stored in any storage component of the RAM 403, the HDD 404, or the ROM 402 and executed by the CPU 401.

First, in the step S801, the process proceeds to step S802 when timer triggering of acquisition of a counter snapshot is detected, and current date and time information and the timer interval of periodical transmission being executed are confirmed, and it is determined whether or not there is a matching with a particular period. As the particular period, cases described below are considered.

Out of timings of timer triggering, a timing of timer triggering at a predesignated date and time.

Out of timings of timer triggering, a timing of triggering after the timer is triggered for the predesignated number of times.

A timing of the latest transmission in a particular period (day/week/month) taking the next timer triggering into consideration.

If it is not determined as a particular period, the process proceeds to step S803, and recollection is not performed, that is, the transmission process of a counter snapshot is performed in the flow after step S612 in FIG. 6.

On the other hand, if it is determined as a particular period, the process proceeds to step S804, and recollection is performed, that is, the transmission process of a counter snapshot is performed in the flow after step S702 in FIG. 7.

With the control described above being included, data transmission in which consistency is checked with recollection can be guaranteed only at a particular timing, and the process is switched to data transmission in which recollection, which is a heavy process, is not performed at any other timings.

As described above, since a job end event of an event-driven is also separately transmitted to a server, correction can be performed on the server side even when there is data inconsistency in a snapshot.

In particular, when the counter snapshot data is used for a billing purpose, in many cases, the correct value only needs to be guaranteed on the date when billing to a customer is performed, that is, a cutoff date, and the counter snapshot data may be used as only a reference at any other timings. The operation switching illustrated in the flowchart of FIG. 8 can realize optimal control of the process load on the client device (multifunctional device) side and the data consistency guarantee in accordance with the demand.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-134700, filed Jul. 22, 2019, which is hereby incorporated by reference herein in its entirety.

What is claimed is:

1. A client device configured to communicate with a server via a network, the client device comprising:
   one or more memories, wherein respective values of a plurality of counters based on one or more jobs performed by the client device are stored in the one or more memories; and
   one or more processors that execute a set of instructions to:
      execute an acquiring process for acquiring (i) the values stored in the one or more memories and (ii) counter information indicating a total of the respective values of the plurality of counters;
      in response to at least one job having been executed during the acquiring process and before completing the acquisition of the counter information, select a counter associated with the at least one job from the plurality of counters;
      reacquire a value of the selected counter from the one or more memories; and
      transmit, to the server, data including at least the counter information acquired on the acquiring process and the reacquired value.

2. The client device according to claim 1, wherein the one or more processors further execute the set of the instructions to:
   transmit the values and the counter information acquired on the acquiring process to the server without reacquiring a value in a case where it is determined that the client device has not been performed at least one job during the acquiring process.

3. The client device according to claim 1, wherein the counter is selected based on a person who executes the at least one job or an execution content of the at least one job.

4. The client device according to claim 1, wherein when current time is not included in a predetermined period when an event periodically activated by a timer is activated, a value of a counter related to a job performed during the acquiring process for the event is not reacquired.

5. The client device according to claim 4, wherein the predetermined period is any one of predesignated date and time and the latest transmission timing in a particular period.

6. A control method of a client device configured to communicate with a server via a network and including one or more memories that stores respective values of a plurality of counters based on one or more jobs performed by the client device, the control method comprising:
   executing an acquiring process for acquiring (i) the values stored in the one or more memories and (ii) counter information indicating a total of the respective values of the plurality of counters;
   in response to at least one job having been executed during the acquiring process and before completing the acquisition of the counter information, selecting a counter associated with the at least one job from the plurality of counters;
   reacquiring a value of the selected counter from the one or more memories; and
   transmitting, to the server, data including at least the counter information acquired on the acquiring process and the reacquired value.

7. A non-transitory computer readable storage medium on which a computer program is stored for making a computer execute a control method for a client device configured to communicate with a server via a network and including one or more memories that stores respective values of a plurality of counters based on one or more jobs performed by the client device, the control method comprising:
   executing an acquiring process for acquiring (i) the values stored in the one or more memories and (ii) counter information indicating a total of the respective values of the plurality of counters;
   in response to at least one job having been executed during the acquiring process and before completing the acquisition of the counter information, selecting a counter associated with the at least one job from the plurality of counters;
   reacquiring a value of the selected counter from the one or more memories; and
   transmitting, to the server, data including at least the counter information acquired on the acquiring process and the reacquired value.

* * * * *